US011647067B2

(12) United States Patent
Zheng et al.

(10) Patent No.: US 11,647,067 B2
(45) Date of Patent: May 9, 2023

(54) CACHED WEB PROBES FOR MONITORING USER EXPERIENCE

(71) Applicant: Zscaler, Inc., San Jose, CA (US)

(72) Inventors: Chenglong Zheng, Fremont, CA (US); Srikanth Devarajan, Cupertino, CA (US); Vikas Mahajan, Ludhiana (IN); Sandeep Kamath Voderbet, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 17/235,267

(22) Filed: Apr. 20, 2021

(65) Prior Publication Data

US 2022/0286494 A1 Sep. 8, 2022

(30) Foreign Application Priority Data

Mar. 5, 2021 (IN) .............................. 202111009339

(51) Int. Cl.
*G06F 15/173* (2006.01)
*H04L 67/02* (2022.01)
*H04L 43/12* (2022.01)
*H04L 67/61* (2022.01)
*H04L 67/561* (2022.01)
*H04L 67/5682* (2022.01)
(Continued)

(52) U.S. Cl.
CPC .............. *H04L 67/02* (2013.01); *H04L 43/12* (2013.01); *H04L 63/0281* (2013.01); *H04L 63/0428* (2013.01); *H04L 67/561* (2022.05); *H04L 67/568* (2022.05); *H04L 67/5682* (2022.05); *H04L 67/61* (2022.05)

(58) Field of Classification Search
CPC ..... H04L 67/2842; H04L 67/02; H04L 67/28; H04L 67/2852; H04L 63/0281; H04L 43/12; G06F 16/9574; H04N 21/23106
See application file for complete search history.

(56) References Cited

U.S. PATENT DOCUMENTS

| 8,224,964 B1* | 7/2012 | Fredrickson ............ H04L 67/32 709/227 |
| 8,370,474 B1* | 2/2013 | Reeves ................... G06F 16/00 709/227 |
| 8,464,335 B1 | 6/2013 | Sinha et al. |

(Continued)

OTHER PUBLICATIONS

Phathisile Sibanda, Database Evaluation a Comparative Investigation and Evaluation of Oracle 9i and SQL Server 2000 with respect to Performance and Scalability, 2005, pp. 1-55. (Year: 2005).*

*Primary Examiner* — Chirag R Patel
(74) *Attorney, Agent, or Firm* — Baratta Law PLLC; Lawrence A. Baratta, Jr.; Ryan Odessa

(57) ABSTRACT

Techniques for using web probes for monitoring user experience including use of caching to prevent a surge of web probes on destination servers and for detecting web probe traffic through a proxy including where the traffic is encrypted. A method implemented by a proxy includes receiving a response to a first web probe to a destination server; caching data associated with the response to the first web probe in a cache; receiving a request for a second web probe to the destination server; and serving a response to the second web probe utilizing the data in the cache in lieu of forwarding the second web probe to the destination server.

18 Claims, 14 Drawing Sheets

(51) Int. Cl.
*H04L 67/568* (2022.01)
*H04L 9/40* (2022.01)

(56) References Cited

U.S. PATENT DOCUMENTS

| | | | |
|---|---|---|---|
| 8,495,737 | B2 | 7/2013 | Sinha et al. |
| 8,955,091 | B2 | 2/2015 | Kailash et al. |
| 9,060,239 | B1 | 6/2015 | Sinha et al. |
| 9,369,433 | B1 | 6/2016 | Paul et al. |
| 9,473,537 | B2 | 10/2016 | Sinha et al. |
| 10,728,113 | B2 | 7/2020 | Sinha et al. |
| 10,728,117 | B1 | 7/2020 | Sharma et al. |
| 2004/0039798 | A1* | 2/2004 | Hotz ............... H04L 61/1511 709/219 |
| 2006/0167891 | A1* | 7/2006 | Blaisdell ............ G06F 11/3495 |
| 2008/0195831 | A1* | 8/2008 | Tsukamoto ........... G06F 3/0689 711/167 |
| 2008/0209040 | A1* | 8/2008 | Rathi ................ H04L 67/568 709/226 |
| 2010/0268789 | A1* | 10/2010 | Yoo ................. H04L 67/2842 709/214 |
| 2011/0055470 | A1* | 3/2011 | Portolani ........... H04L 43/0864 711/108 |
| 2011/0277027 | A1 | 11/2011 | Hayton et al. |
| 2012/0304244 | A1 | 11/2012 | Xie et al. |
| 2013/0311832 | A1 | 11/2013 | Lad et al. |
| 2015/0195291 | A1 | 7/2015 | Zuk et al. |
| 2015/0326613 | A1 | 11/2015 | Devarajan et al. |
| 2016/0241667 | A1* | 8/2016 | Kulkarni ............ H04L 67/2842 |
| 2017/0111256 | A1* | 4/2017 | Neal .................. H04L 41/0823 |
| 2017/0210731 | A1 | 7/2017 | Kumar et al. |
| 2017/0250887 | A1 | 8/2017 | Sadana et al. |
| 2017/0315902 | A1 | 11/2017 | Moretto et al. |
| 2017/0366421 | A1 | 12/2017 | Dam et al. |
| 2019/0004863 | A1* | 1/2019 | Mainali ................ G06F 9/5061 |
| 2019/0050332 | A1* | 2/2019 | Alameldeen ........ G06F 12/0891 |
| 2020/0244758 | A1* | 7/2020 | Enguehard ....... H04N 21/25891 |
| 2020/0274782 | A1 | 8/2020 | Balaiah et al. |
| 2020/0274783 | A1 | 8/2020 | Sharma et al. |
| 2020/0274784 | A1 | 8/2020 | Sharma et al. |
| 2021/0218726 | A1* | 7/2021 | Sundararajan .......... H04L 67/02 |
| 2021/0234919 | A1* | 7/2021 | Paralikar ............. H04L 67/563 |

* cited by examiner

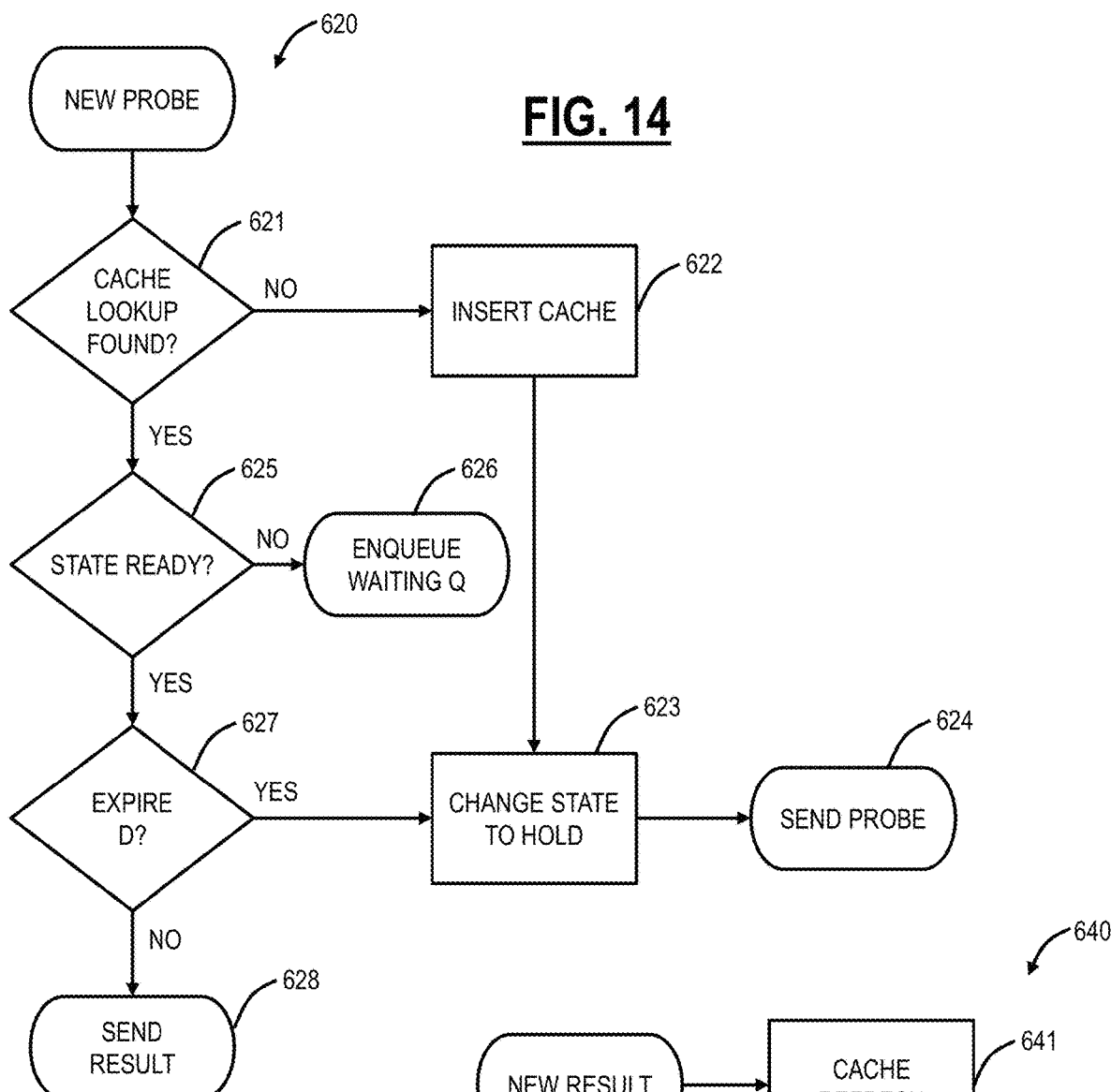

CACHED WEB PROBES FOR MONITORING USER EXPERIENCE

FIELD OF THE DISCLOSURE

The present disclosure relates generally to networking and computing. More particularly, the present disclosure relates to various techniques for using web probes for monitoring user experience including use of caching to prevent a surge of web probes on destination servers and for detecting web probe traffic through a proxy including where the traffic is encrypted.

BACKGROUND OF THE DISCLOSURE

The trend in Information Technology (IT) includes applications and resources being located in the cloud, users working from home or anywhere, and for the Internet becoming the new corporate network. As such, there is a need for IT to monitor and isolate issues affecting the user-to-cloud application experience. That is, there is a need for IT administrators to have visibility into the network and details of service paths. Various User Experience (UX or UEX) tools and approaches seek to quantify an individual user's satisfaction with a product or service such as a networking application. Examples include End User Experience Monitoring (EUEM) tools, Network Performance Monitoring and Diagnostics Market (NPMD) tools, Application Performance Monitoring (APM) tools, and Digital Experience Monitoring (DEM) tools.

One aspect of these tools includes network measurements, such as using a web probe. As described herein, a web probe is used to collect metrics associated with a web page, such as page fetch time, Domain Name Server (DNS) time, server response time, availability, etc. In a large-scale deployment, there can be a surge or excessive amount of traffic served on a destination server that can cause possible blocking (e.g., in a block list) or filtering of traffic.

Also, with increasing network sniffing and network threats, many enterprises use encrypted tunnels. Also, cloud-based systems can forward traffic to the cloud using encrypted tunnels. For example, tunnels can be based on Generic Routing Encapsulation (GRE), Layer Two Tunneling Protocol (L2TP), Internet Protocol (IP) Security (IPsec), Virtual Private Networks (VPN), Hypertext Transfer Protocol (HTTP), Transmission Control Protocol (TCP), etc. It would be advantageous to identify web probes through a proxy even when there is encryption.

BRIEF SUMMARY OF THE DISCLOSURE

The present disclosure relates to various techniques for using web probes for monitoring user experience including use of caching to prevent a surge of web probes on destination servers and for detecting web probe traffic through a proxy including where the traffic is encrypted. In an embodiment, a non-transitory computer-readable medium, a proxy, and a method include steps of receiving a response to a first web probe to a destination server; caching data associated with the response to the first web probe in a cache; receiving a request for a second web probe to the destination server; and serving a response to the second web probe utilizing the data in the cache in lieu of forwarding the second web probe to the destination server. The steps can include removing the data in the cache after a configurable time period. The steps can include receiving a request for the first web probe prior to the response; and sending the first web probe to the destination server prior to the response. The steps can include receiving a third web probe while a response to a fourth web probe is outstanding; and queuing the third web probe until the response to the fourth web probe is cached. The data in the cache can include how the first web probe is forwarded to the destination server. The response to the second web probe can include truncated data. The web probe can be one of a Hypertext Transfer Protocol (HTTP) and HTTP-Secure (HTTPS) request to a Uniform Resource Locator (URL) of the destination server. The data in the cache can be stored as a hash table with a key being an identifier for a tenant plus a hash of the first web probe and a value is results.

In another embodiment, a non-transitory computer-readable medium, a proxy, and a method include steps of receiving encrypted traffic with an indicator in a header indicating a request for probe traffic; inspecting the request and a response for the probe traffic; and caching data associated with the response to in a cache. The steps can include serving a response to additional web probes utilizing the data in the cache in lieu of forwarding the additional web probes to the destination server. The steps can include checking the cache for the response; and serving the response out of the cache in lieu of forwarding the request to a destination. The steps can include removing the data in the cache after a configurable time period. The indicator can be in a first HTTP CONNECT request. The indicator can be in proprietary HTTP header. The web probe can be one of a Hypertext Transfer Protocol (HTTP) and HTTP-Secure (HTTPS) request to a Uniform Resource Locator (URL) of the destination server. The proxy can be configured to not inspect the encrypted traffic.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

FIG. 14 is a flowchart of a process for a new result from a web probe with caching.

FIG. 15 is a state diagram for the cache of web probes.

DETAILED DESCRIPTION OF THE DISCLOSURE

Figure 1:
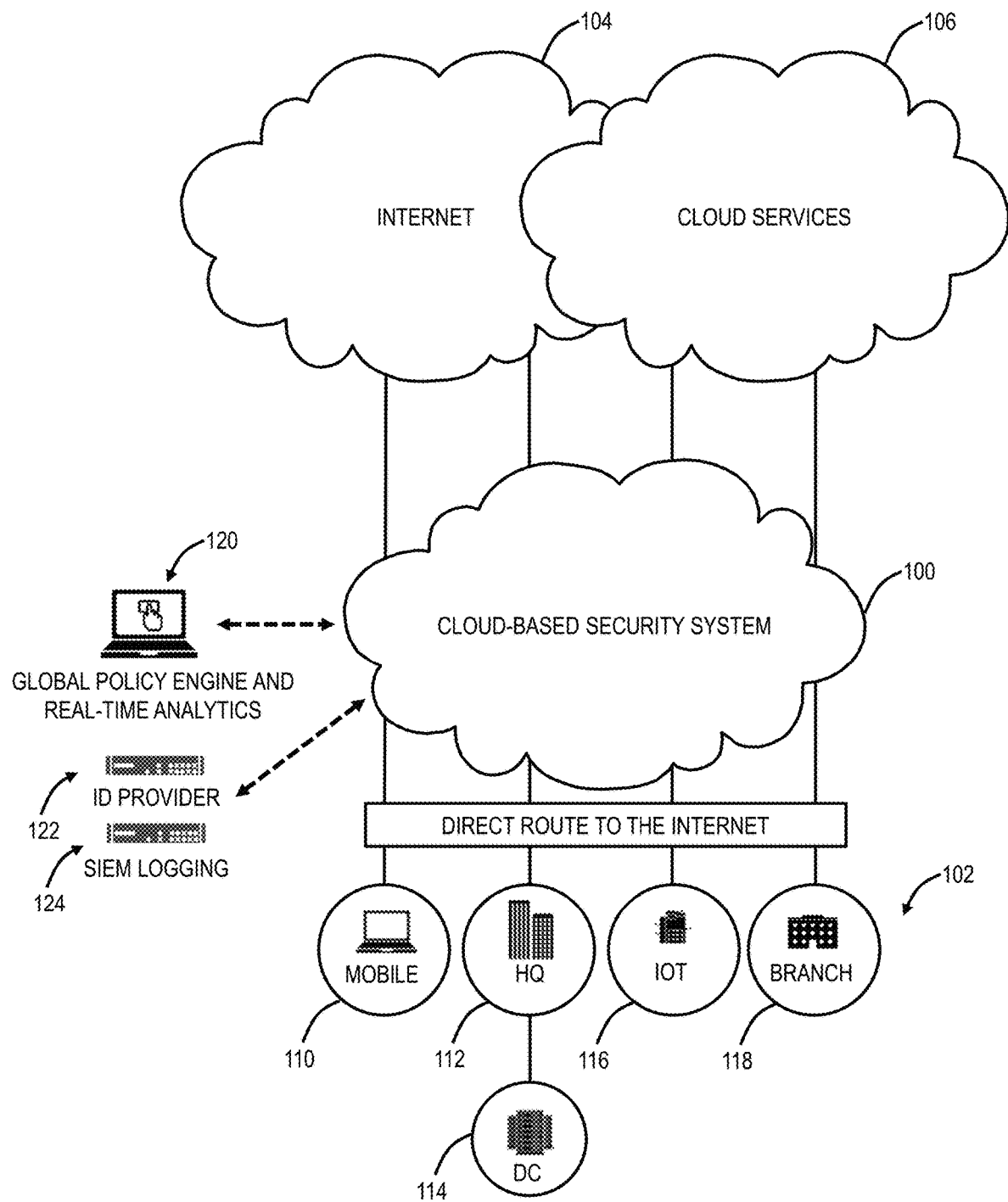
FIG. 1 is a network diagram of a cloud-based system offering security as a service.

Again, the present disclosure relates to various techniques for using web probes for monitoring user experience including use of caching to prevent a surge of web probes on destination servers and for detecting web probe traffic through a proxy including where the traffic is encrypted. As described herein, web probes are HTTP-based probes used to measure website performance for a device for determining metrics for downloading a Uniform Resource Locator (URL). The metrics can include, for example, DNS resolve times, TCP connect times, SSL handshake time, page size, site availability, transfer type (Content-length/Chunked), Time to first byte (TTFB), and the Time to last byte (TTLB). The present disclosure utilizes web probes between a plurality of user devices, a cloud-based system, and destination servers. The cloud-based system can provide digital experience monitoring of its users with the web probes providing metrics. The cloud-based system can reside inline between the users and the destination servers. The plurality of user devices can generate synthetic HTTP web probes, and the cloud-based system can monitor the traffic as a proxy.

In an embodiment, to prevent a surge of traffic due to web probes on destination servers, the present disclosure includes caching results on a proxy for a finite configurable time. For that time interval, all subsequent web probe requests are served out of the cache rather than making a new request for every probe the proxy receives. While one request is pending on a destination, any probe that arrives for the same destination will be held in a queue and responded from the cache when the response for the first request arrives and is cached. To prevent storing excessive amounts of data in the cache, a finite amount of data is stored in the cache while storing the actual size of the original payload. While serving data out of the cache, truncated data is served with zeros to make sure that the time to transfer the payload to the requestor is factored. If the web page being stored (text/html) has HTML links and needs to be truncated due to the size limitation of the cache size, the page is reformatted so as to not lose any valuable information.

Unique cache entries are created based on the request properties that go beyond just the URL and also on policies that govern how the request would be forwarded to the destination like Destination Network Address Translation (DNAT)/Proxy chaining policies. All policies that are applied to regular traffic are also applied to the probe traffic so that metrics match that of the real requests. The only exception are SSL policies that prevent decrypting the traffic as that will prevent caching the data.

In another embodiment, in order to differentiate the web probe traffic from the normal traffic in encrypted tunnels, an HTTP Connect tunnel can be used when the presence of a proxy in the path is known. When the Proxy observes the presence of this header it would be able to mark the request as a probe traffic and turns on forced SSL inspection of the request and response. Force inspecting the traffic helps caching the response preventing the surge of requests to the destination. When there is a transparent proxy, the client will not send the HTTP Connect request, in which case, a proprietary HTTP header can be identified in the request to classify such probes when the traffic is unencrypted. In case of encrypted traffic, the client can add a proprietary header in the SSL client hello extension to give a hint to the proxy that it is probe traffic based on which the proxy can decide to throttle such requests.

§ 1.0 Example Cloud-Based System Architecture

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
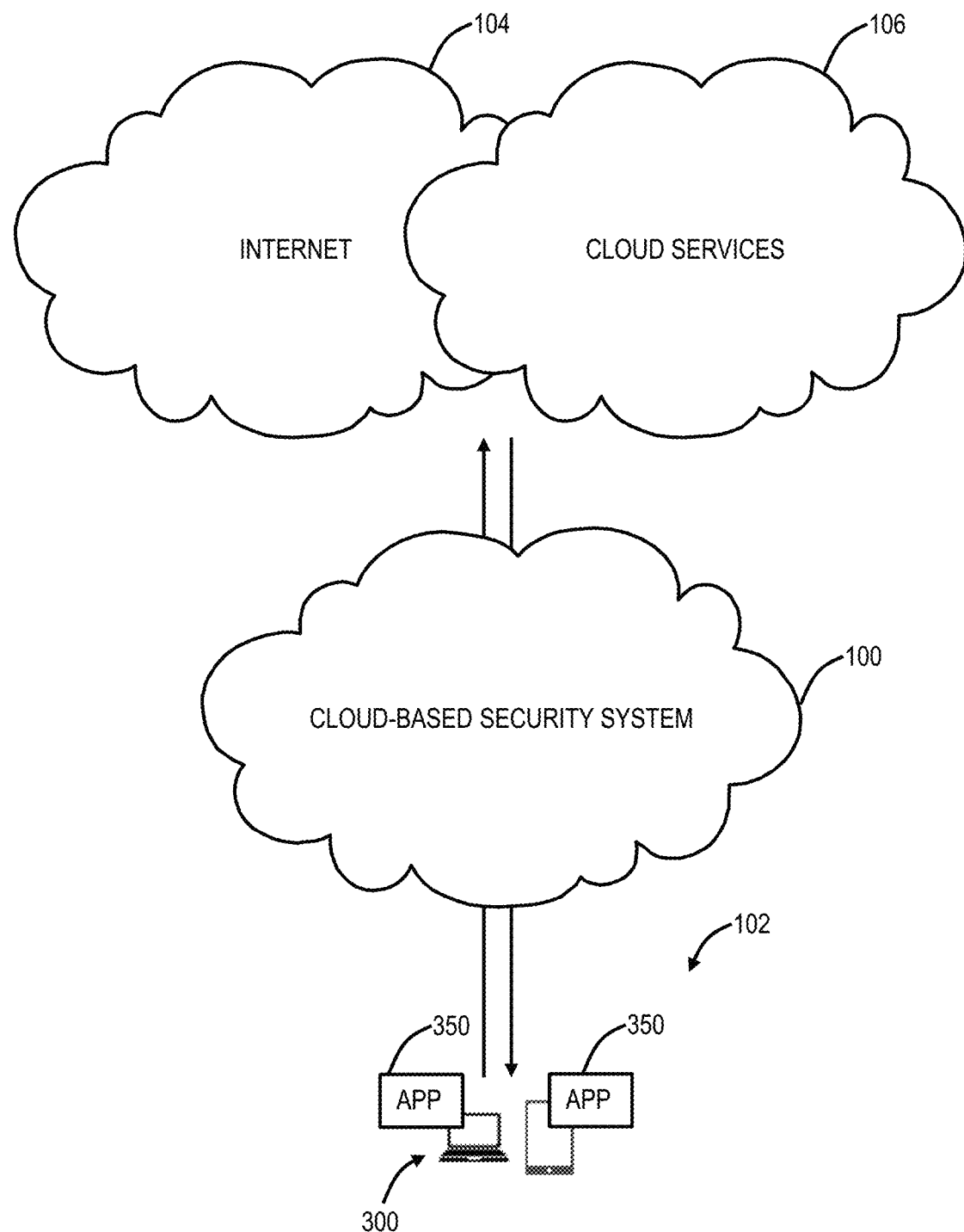
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
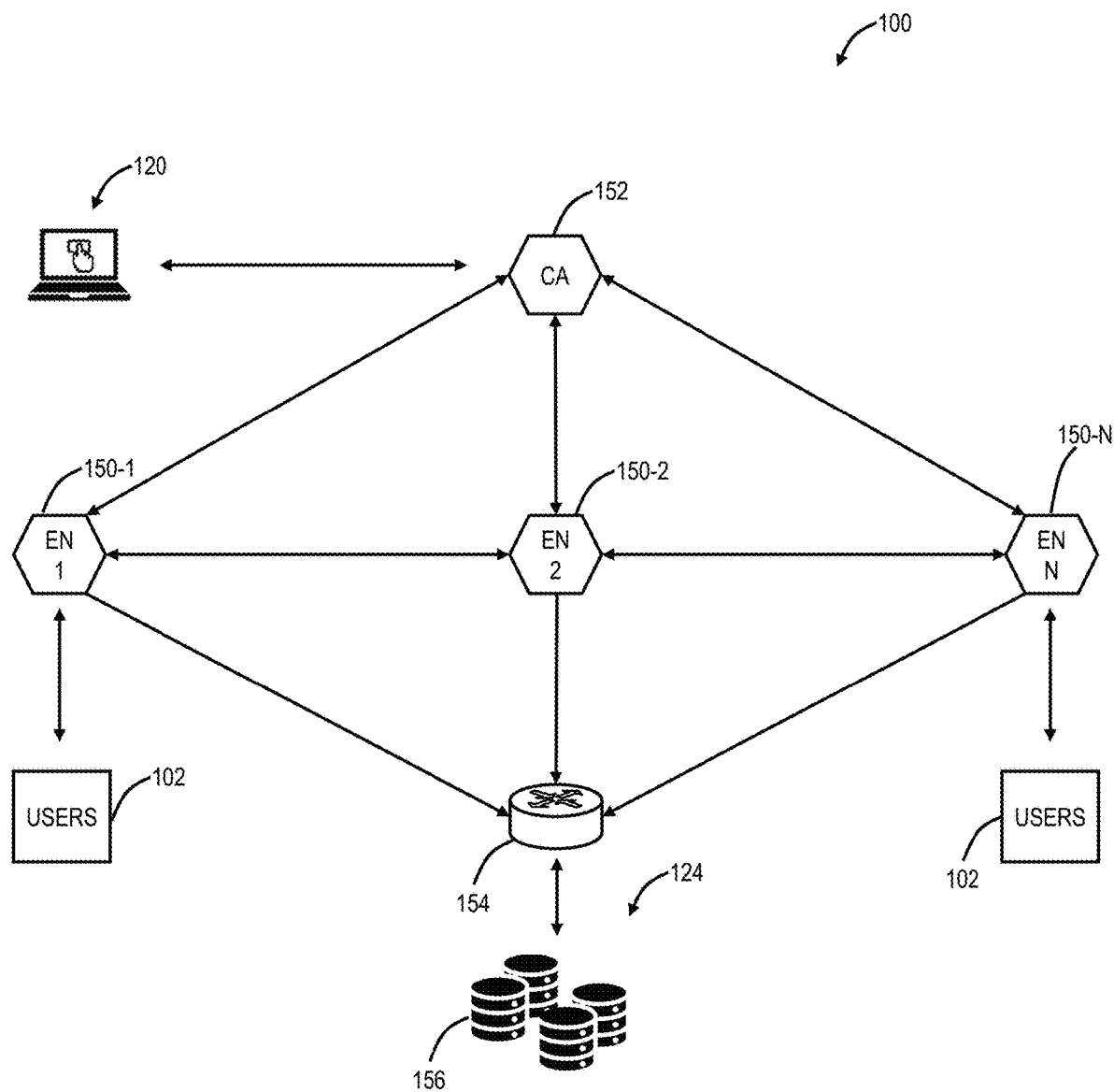
FIG. 2 is a network diagram of an example implementation of the cloud-based system.
Figure 4:
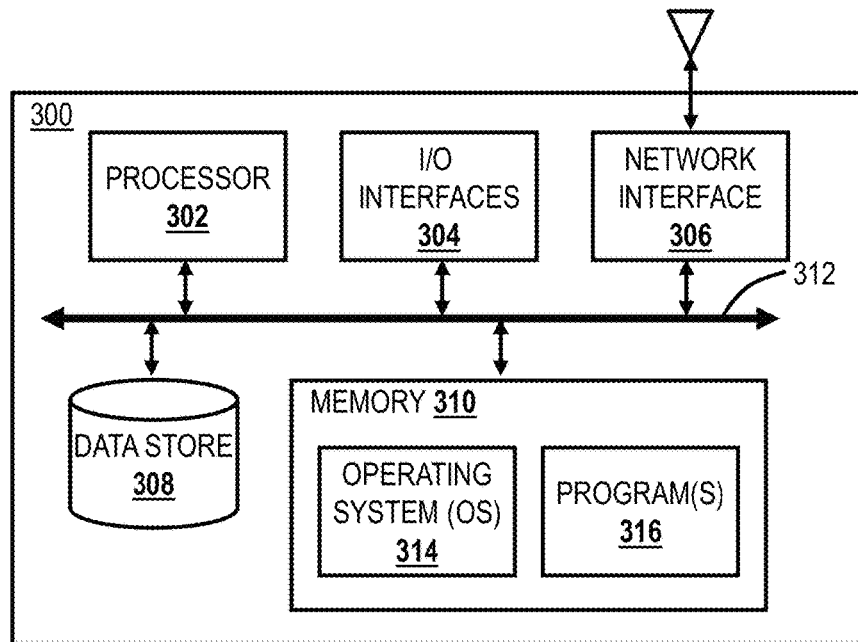

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security, i.e., proxies. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 2.0 User Device Application for Traffic Forwarding and Monitoring

Figure 3:
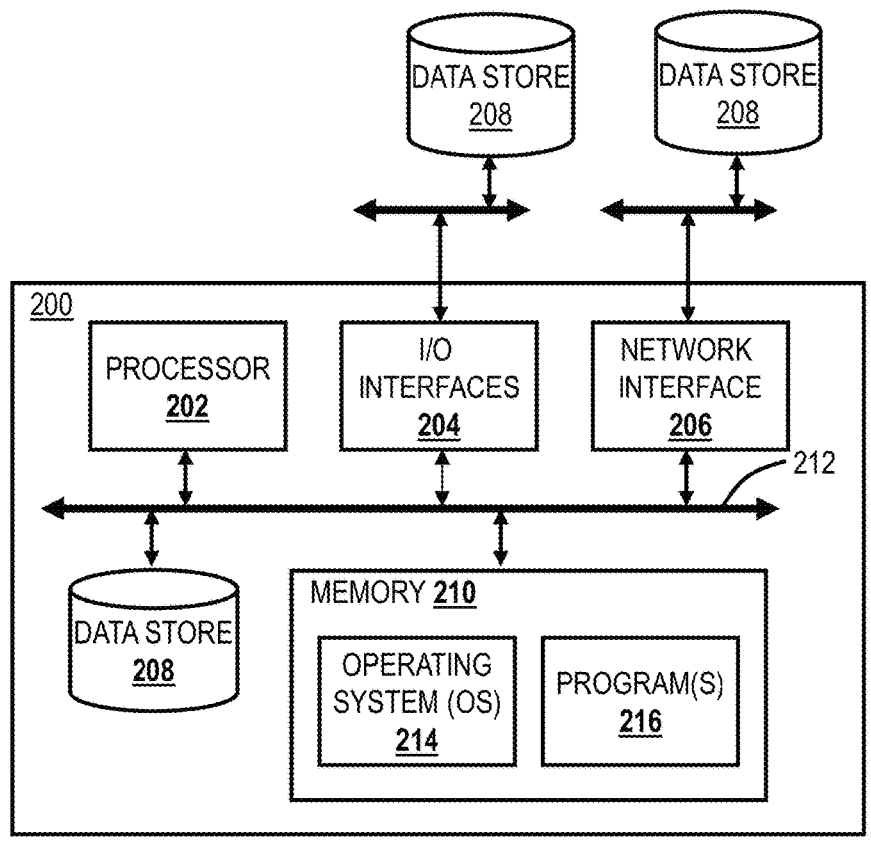

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
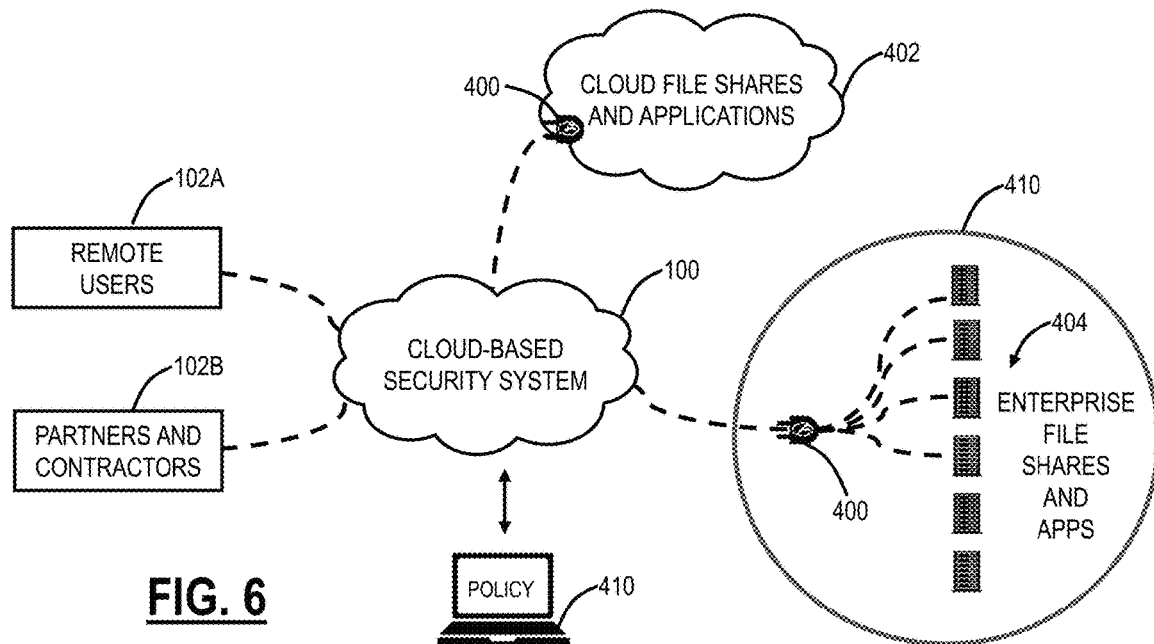
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
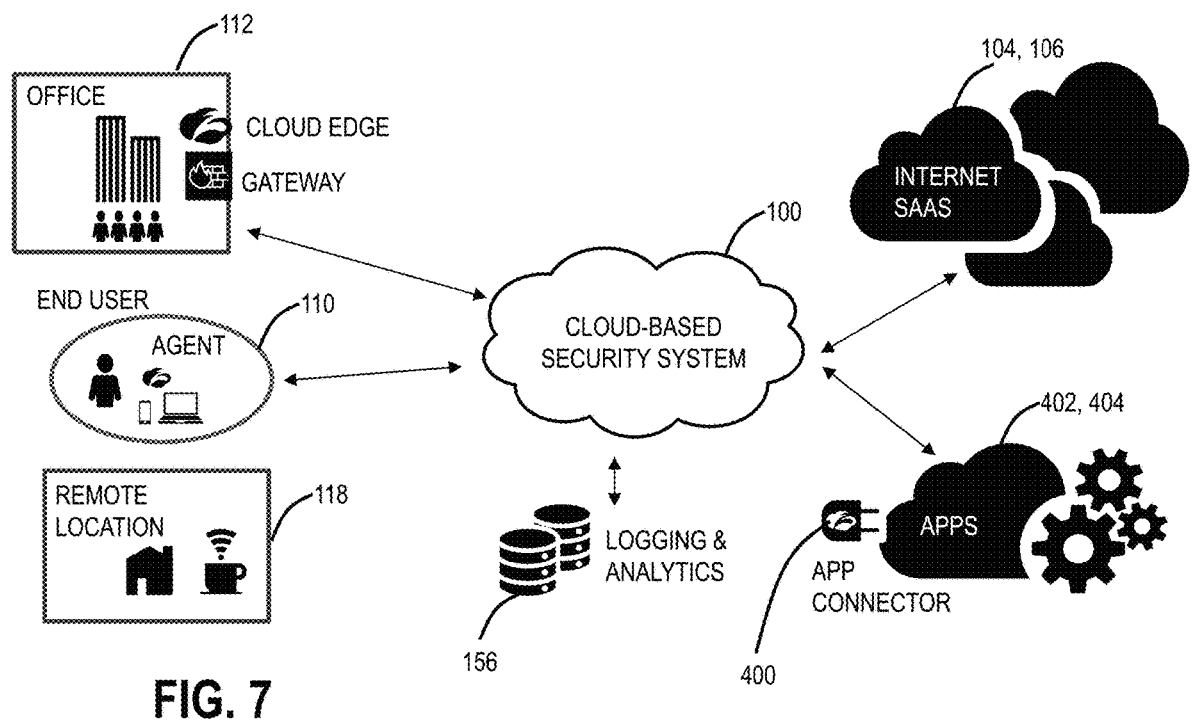
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.)

and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
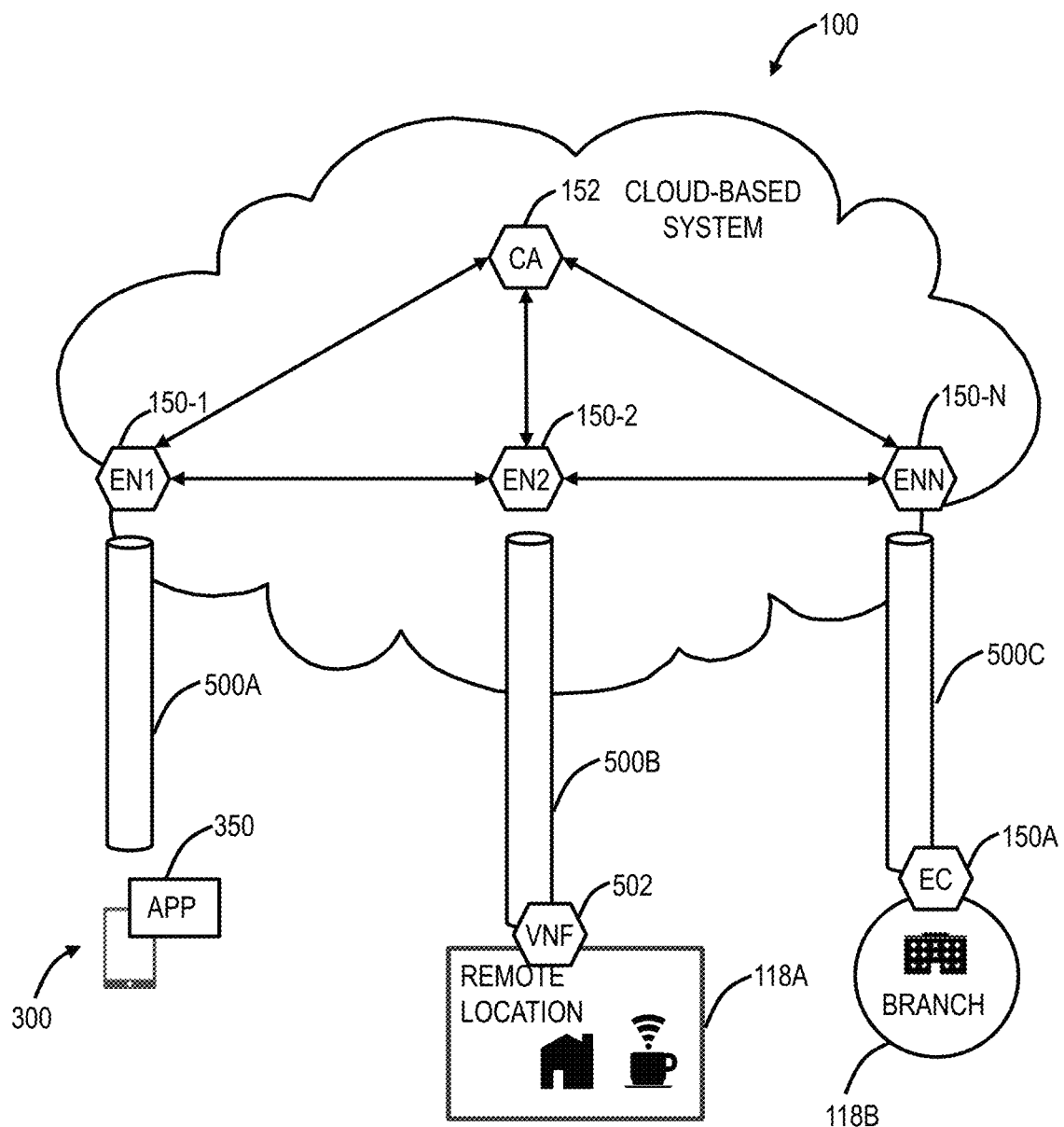
FIG. 8 is a network diagram of the cloud-based system of FIGS. 1 and 2 with various cloud tunnels, labeled as cloud tunnels, for forwarding traffic.
Figure 9:
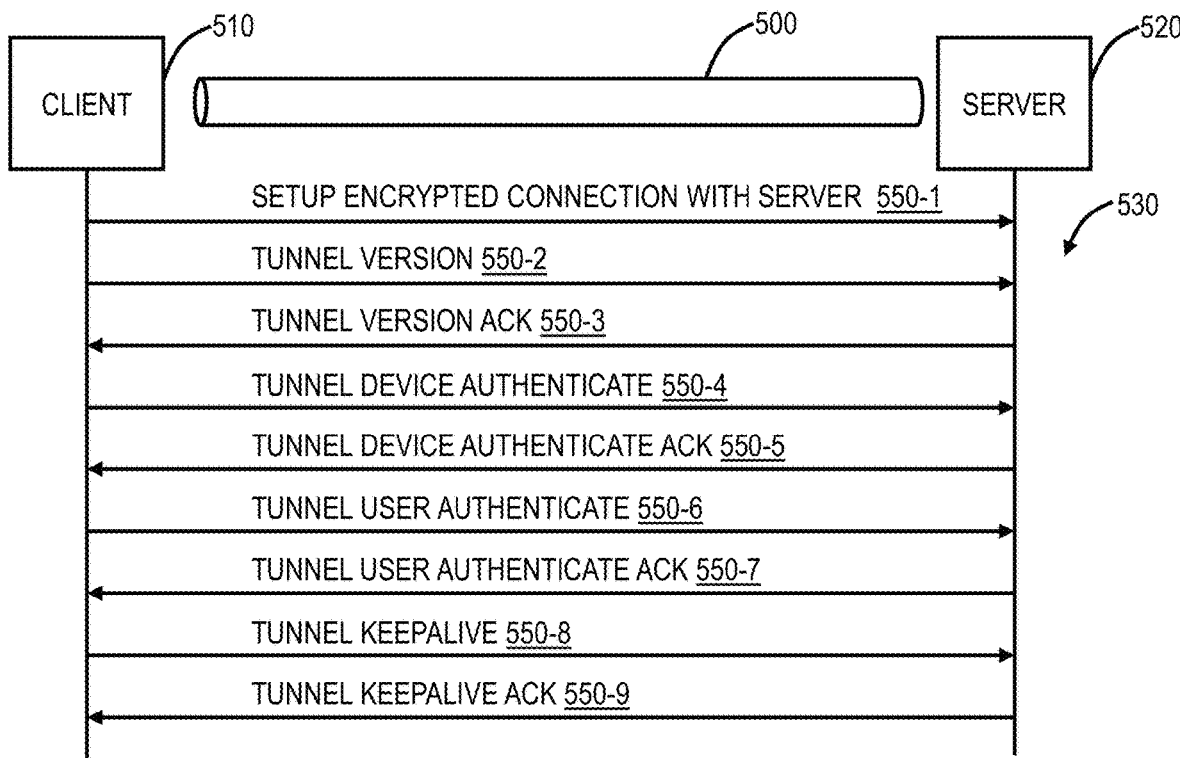
FIGS. 9 and 10 are flow diagrams of a cloud tunnel illustrating a control channel (FIG. 9) and a data channel (FIG. 10), with the tunnel illustrated between a client and a server.
Figure 10:
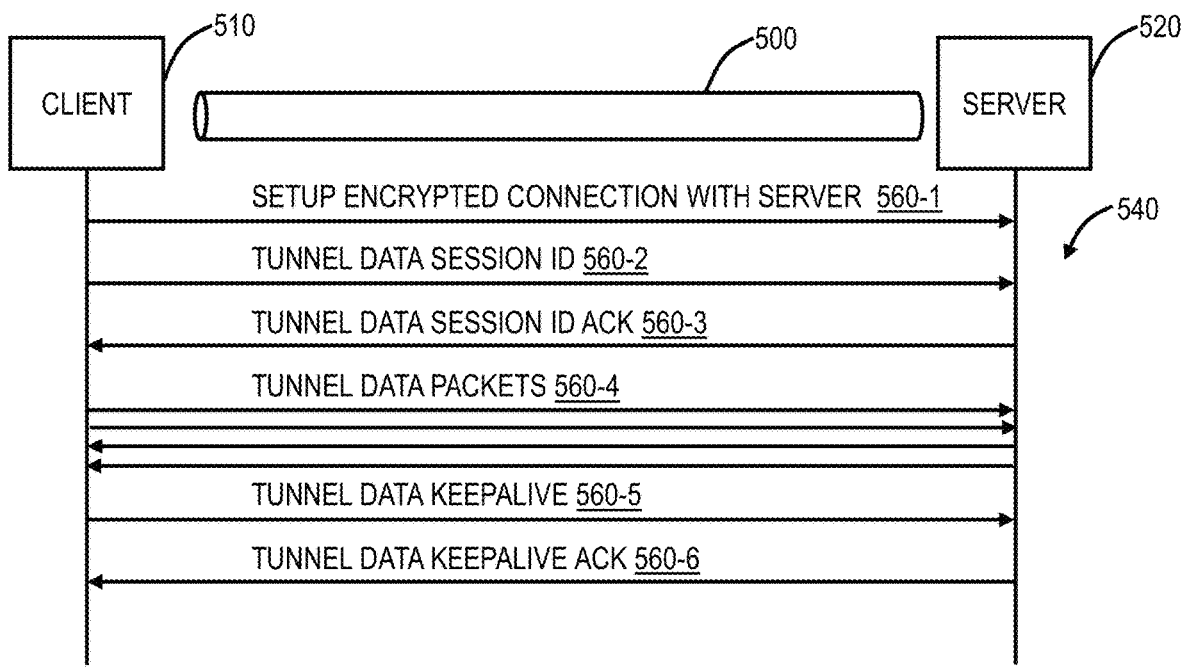

FIG. 8 is a network diagram of the cloud-based system 100 with various cloud tunnels 500, labeled as cloud tunnels 500A, 500B, 500C, for forwarding traffic. FIGS. 9 and 10 are flow diagrams of a cloud tunnel 500 illustrating a control channel (FIG. 9) and a data channel (FIG. 10), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to as a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 9 and 10 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

Figure 11:
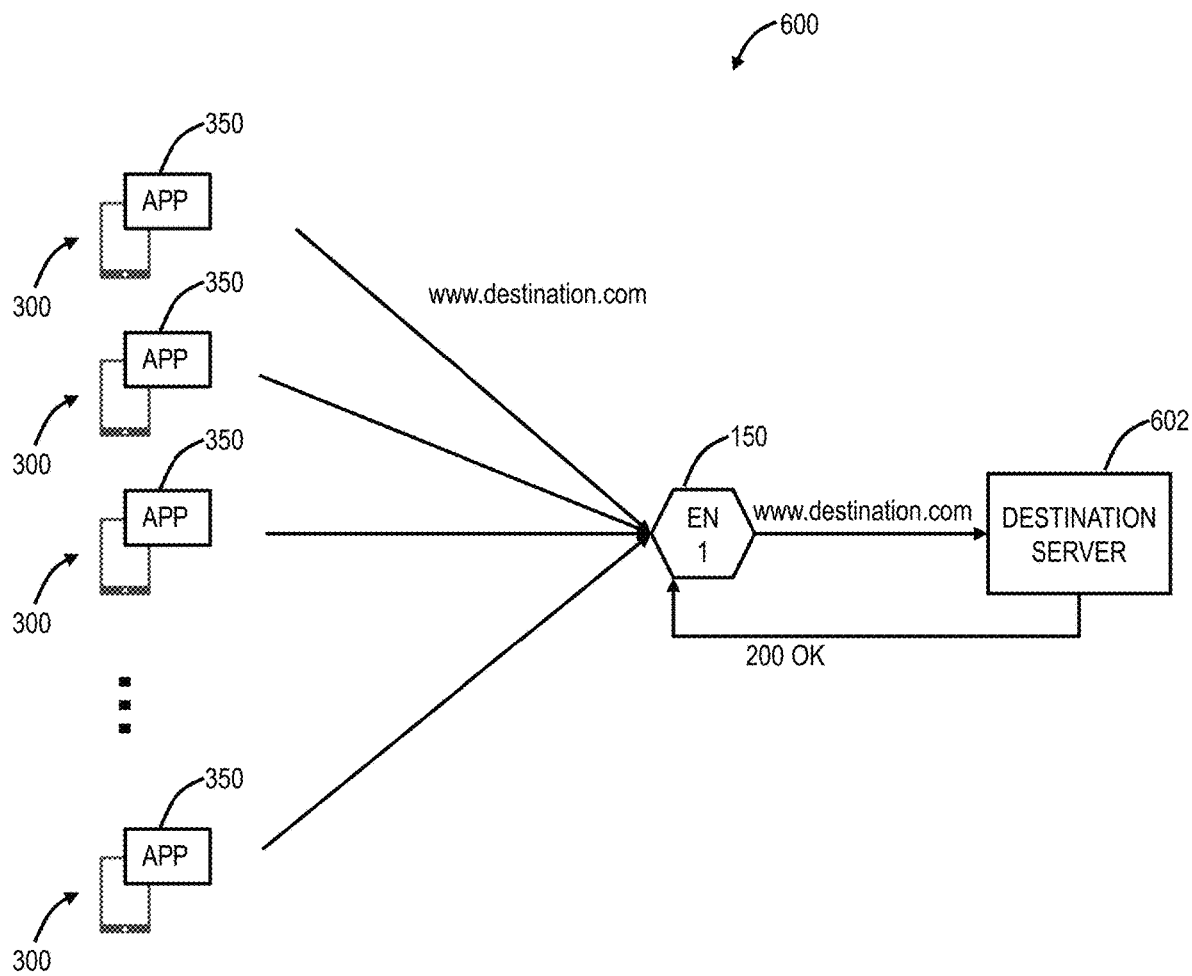
FIG. 11 is a network diagram of a network illustrating an example use of web probes.

In FIG. 9, the control channel 530 is illustrated with exchanges between the client 510 and the server 520. Again, the control channel 530 includes TLS encryption, which is established through a setup or handshake between the client 510 and the server 520 (step 550-1). An example of a handshake is illustrated in FIG. 11. The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

In FIG. 10, similar to FIG. 9, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello server name extension. That proprietary data helps a load balancer balance the new DTLS connection to the same server 200 in a cluster where the connection prior to network change was being processed. So, a newly established DTLS connection with different IP address (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

§ 8.0 Web Probes

Again, web probes are used to collect metrics for a measure of web site performance. For example, metrics can include page fetch time, DNS time, server response time (TTFB, TTLB), availability, etc. The page fetch time collects the network fetch time of the web page from the URL-specified web probe. It requests only the top-level page document and does not request all embedded links within the web page. This provides users with a metric similar to other developer tools. DNS represents the time it took to resolve the DNS name for the hostname specified in the web probe URL. If a success code is returned, the availability will be either 1 or 0. If the probe times out, the availability defaults to 0.

Web probes can be used with traceroute probes to measure cloud performance and to troubleshoot network and proxy issues. Traceroute probes are described, e.g., in commonly-assigned U.S. patent application Ser. No. 17/149,026, filed Jan. 14, 2021, and entitled "Detection of network hops and latency through an opaque tunnel and detection misconfiguration of tunnels," the contents of which are incorporated by reference in their entirety. Web probes include HTTP and HTTPS probe and URL schema in configuration determines which type is used. Traceroute probes can be TCP, UDP or WNW probes, Other types of probes are also contemplated, such as Voice over IP (VOW) probes, DNS probes, File Transfer Protocol (FTP) probes, and the like.

Web Probe Optimization

FIG. 11 is a network diagram of a network 600 illustrating an example use of web probes. Here, there are a plurality of user devices 300, such as with the application 350, sending web probes to a destination server 602, e.g., www.destination.com. This can be through the cloud-based system 100 via an enforcement node 150. To avoid having the enforcement node 150 send too many probes to the same URL possibly leading to the enforcement node 150's IP address becoming blacklisted, only one web probe is sent for one URL by the enforcement node 150. For example, all of the user devices 300 are sending a web probe to the destination server 602, via the enforcement node 150, and the enforcement node 150 can only send one web probe, caches results, and serve multiple response to the user devices 300 for the web probe to the destination server 602 for a given time.

That is, the enforcement node 150 (or some proxy) is configured to transmit a single web probe to the destination server 602 and then to service any future web probes for a finite configurable time from cache based on the single web probe, instead of making a new request. While one request is pending to the destination server 602, any probe that arrives for the same destination server 602 can be held in a queue and responded from the cache when the response for the first request arrives and is cached.

Also, to prevent storing excessive amounts of data in the cache, a finite amount of data is stored while storing the actual size of the original payload. While serving data out of the cache, truncated data can be padded with zeros to make sure that the time to transfer the payload to the requestor is factored. If the web page being stored (text/html) has HTML links and needs to be truncated due to the size limitation of the cache size, the page is reformatted so as to not lose any valuable information.

Unique cache entries are created based on the request properties that go beyond just the URL and also on policies that govern how the request would be forwarded to the destination such DNAT/Proxy chaining policies. All policies that are applied to regular traffic are also applied to the probe traffic so that metrics match that of the real requests. The only exception are SSL policies that prevent us from decrypting the traffic as that will prevent caching the data.

Monitor Request Sequence for Probes in the Cloud Tunnel

Figure 12:
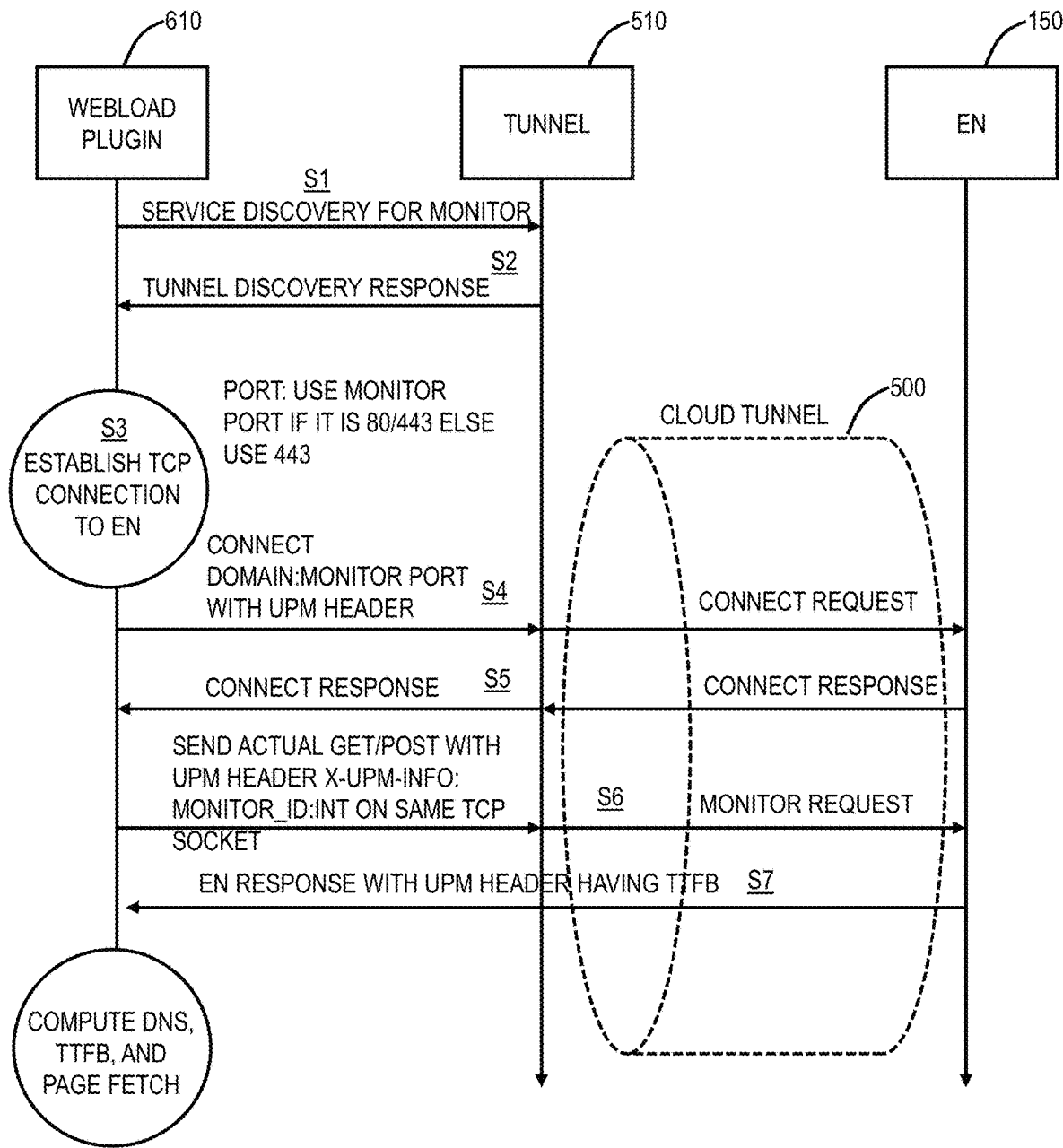
FIG. 12 is a flow diagram illustrating actions between a plugin at the user device, a client of a tunnel, and the enforcement node, with respect to web probes.

FIG. 12 is a flow diagram illustrating actions between a plugin 610 at the user device 300, a client 510 of a tunnel 500, and the enforcement node 150, with respect to web probes. In an embodiment, the present disclosure includes the ability to differentiate the web probe traffic from normal traffic in the cloud tunnel 500. When the proxy observes the presence of a header, it would be able to mark the request as a probe traffic and turns on forced SSL inspection of the request and response. Force inspecting the traffic helps cache the response preventing the surge of requests to the destination. For a transparent proxy, the user device 300 will not send the HTTP Connect request, in which case, there can be a proprietary HTTP header in the request to classify such probes when the traffic is unencrypted. For encrypted traffic, the user device 300 will add a proprietary header in the SSL client HELLO extension to give a hint to the enforcement node 150 that it is a probe traffic based on which the enforcement node 150 can decide to throttle such requests.

In FIG. 12, there is a plugin 610 which can be the application 350 or some other program on the user device 300 for sending web probes. The client 510 is one point for the tunnel 500 and the enforcement node 150 is the other point, namely the server 520. The user device 300 can use an HTTP CONNECT request to the enforcement node 150 to detect if the enforcement node 150 is in between and indicate that the following requests are probe requests, so the enforcement node 150 should do SSL interception no matter whether SSL scan is enabled or not for HTTPS probes.

FIG. 12 includes the processing flow as follows. The plugin 610 sends a service discovery request to the client 510 (step S1), and the client 510 responds with details of the tunnel 500 (step S2). The plugin 610 can establish a TCP connection to the enforcement node 150 (step S3). The plugin 610 sends a connect request to the enforcement node 150 through the tunnel 500 (step S4), and the enforcement node 150 sends a connect response (step S5).

When the plugin 610 sends a web probe, it sends an actual get/post with a Universal plugin Manager (UPM) header X-UPM-INFO: MONITOR_ID:INT on the same TCP socket (step S6). The enforcement node 150 then sends the response with the UPM header having the TTFB (step S7). Other types of headers are contemplated and other parameters can be sent other than just the TTFB.

Cache

Figure 13:
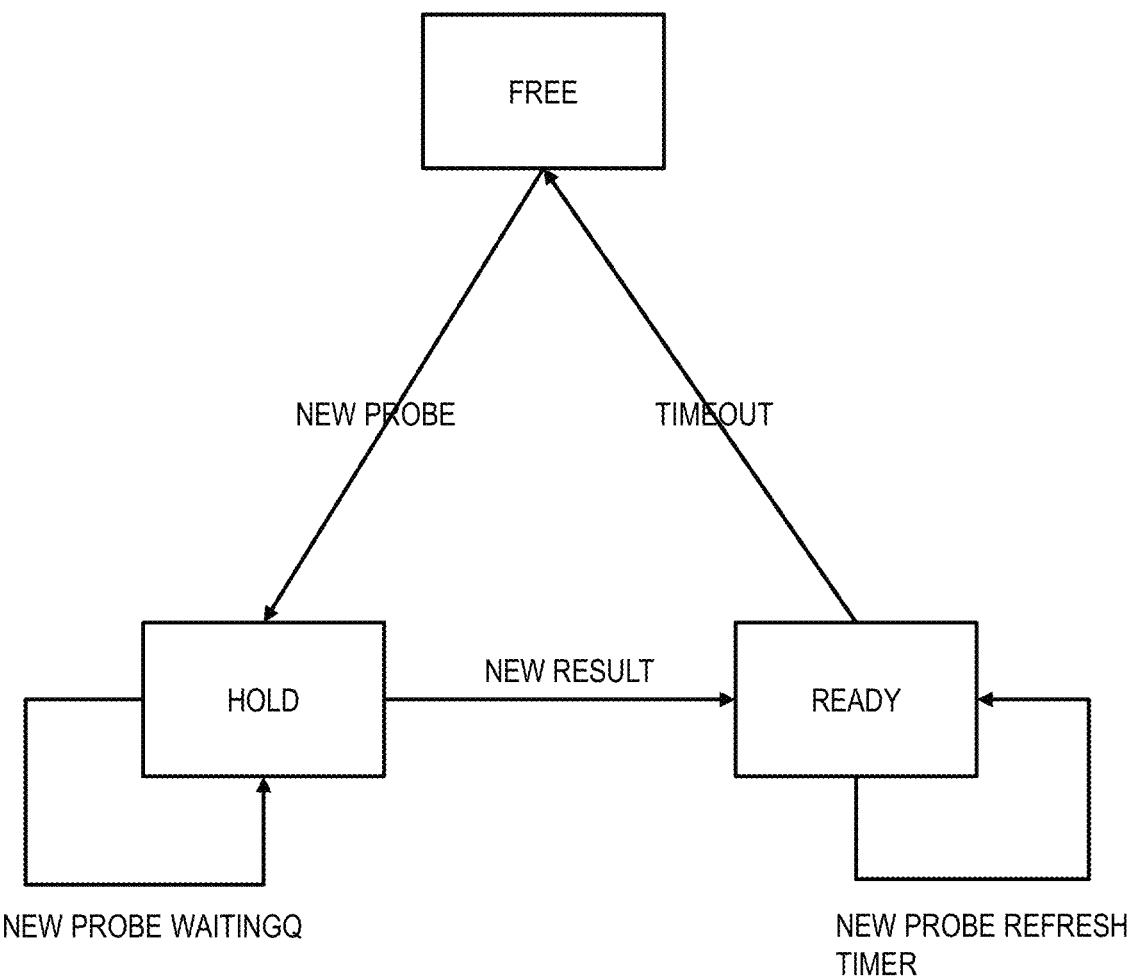
FIG. 13 is a flowchart of a process for a new web probe with caching.

FIG. 13 is a state diagram for the cache of web probes. FIG. 14 is a flowchart of a process 620 for a new web probe with caching. FIG. 15 is a flowchart of a process 640 for a new result from a web probe with caching.

The enforcement node 150 or a proxy is configured inline between a user device 300 sending a web probe and the destination server 602. The cache is utilized herein at the enforcement node 150 or proxy to store results of web probes to the destination server 602 and to service new web probes from the cache while a cached result is stored. In FIG. 13, there are three states for each web probe entry in the cache—FREE, HOLD, or READY. Free is where there is no entry for a destinations server 602 and this occurs at initiation and after a timeout. When a new probe request comes in, there is a waiting queue and the cache is in the HOLD until the result comes back for this new probe request. Then, the new probe result is stored in the READY and maintained until a refresh timer expires, leading to the timeout. While in the READY, results for the destinations server 602 are served from the cache.

The cache can be stored at the enforcement node 150 or proxy in a data store and can be formatted as a hash table with a key being an identifier for a tenant plus the hash of the web probe and the value is the metric results. Metrics result has the time for every step in the traffic processing. The metrics result also has one timestamp field which is used for time out. The metrics cache is used to store the probe result so that it can be used for other probes which are destined to the same URL and HTTP request is same (excluding X-UPM-INFO header).

In FIG. 14, the process 620 begins when a new probe comes, the cache lookup is done at first (step 621). If a cache entry is not found (step 621), a new cache entry with HOLD state (step 623) is inserted (step 622) to the cache table and the probe is sent to the destination server 602 (step 624). HOLD means a probe is being sent or has been sent but the result is not received yet.

If cache is found (step 621) but the state is HOLD (step 625), the request is inserted to the waiting queue of this cache entry (step 626). There is no need to send a probe again since one probe is already sent for the same URL.

If the state is READY (step 625) and cache is expired (step 626), then state is changed to HOLD (step 623) and the probe is sent (step 624). A timer event can be used to check cache timeout every 10 ms, so it is possible that the cache is expired but not freed yet when a new probe comes. If the state is READY (step 625) and cache is not expired (step 627), then the cached result is good to be sent for this probe (step 628).

In FIG. 15, the process 640, on the receiving of the probe result, the cache result is needed to be updated (step 641) and state is changed to READY (step 642). Then the result is sent for every request in the waiting queue and the request is dequeued from the waiting queue (step 643).

Each cache entry can include

> The URL
> The TTFB/Server Resp Time
> The TTLB/Page Fetch Time
> Entry creation time
> Size of the cache entry
> Original size of the payload
> Response header
> Response body
> Transfer encoding: Content-Length/Chunked
> Timeout value
> Resolved IP.

In an embodiment, a Cache entry by default only stores 1 Mb of body (or some other value). Anything in excess is dropped but the original length is kept and the time it took to download the whole body. However, the first page/Landing page threshold is 1.5 times that of normal pages. This will help in case the landing page is large and there is a risk of losing embedded links. When the data is served out of the cache, the time to go to the destination server is not seen by the user device 300. To account for that, the time it took to download the page from the destination is embedded in the response to the user device 300 as these values are stored in the cache. When data is truncated, the time to download the truncated portion from the enforcement node 150 is lost. To account for this, the response is truncated with data.

Chunked Encoding: Assume a payload of 1 Mb to be transferred with a chunk size of 110 Kb including the chunked header+\r\n. With a cache size of 1 Mb, it is possible to hold 9 full chunks bringing it to 990 KB. Now the last chunk which is just over 10 Kb will be completely dropped. It was determined that 99.98% of the pages were under 1 Mb. So, the 1 Mb default seems reasonable. Of course, the 1 Mb and 1.5 times are configurable values.

Probe with Redirect Policy and DNAT

In redirect policy and DNAT cases, the proxy to server path can be different even if two HTTP requests are exactly the same; so TTLB and TTFB are different. In this manner, they should be treated separately which is why there can be a tenant identifier, if source IP anchoring is enabled.

SSL Interception

The enforcement node 150 or proxy can perform SSL interception if an X-UPM-INFO header is detected in the first HTTP CONNECT request.

Metrics in HTTP/HTTPS Response

TTFB (Time To First Byte)) and TTLB (Time To Last Byte) are added to the response header in custom headers X-UPM-INFO:

ttfb:int_val,ttlb:int_val, cache:int_val,tr ncated:int_val,Content-Length:int_val.

The "Cache" field tells how long since the cache entry was created (e.g., in milliseconds). The "Truncated" field tells if the response sent by the enforcement node 150 or proxy is truncated or not. The "Content-Length" tells the original content length (It can be different from what the client receives when response is truncated).

For probes which are bridged (no matter HTTP/HTTPS transaction) due to HTTP parsing errors or other reasons, the same pending probes are dropped, resp body case is deleted and cache is still valid so that next same request will be bridged directly.

X-UPM-INFO header is inserted to both the first response which is got from server and following responses which are got from cache. "Cache" field can be used to indicate if the response is got from cache or not.

For the first probe, all fields in the X-UPM-INFO header of response are zero, because the user device 300 does not need them.

For probes which are served from cache but the result is not in READY state (it is waiting for the response for the first probe), the time wait in the waiting queue is recorded. The wait time in the waiting queue is caused by the cache mechanism and should not be counted but user devices 300 are counting it. So, it is deducted from TTFB and TTLB so a user device 300 can get the correct time.

Cache Examples

The following illustrates an example.

At time T0, user device 1 sends a probe to the enforcement node 150 and starts its timer; the enforcement node 150 sends the probe to the destination server 602;

At time T1, user device 2 sends a probe to the enforcement node 150 and starts its timer; the enforcement node 150 queues the probe;

At time T2, the enforcement node 150 receives the first response from the destination server 602, so TTFB is T2; the response is also sent to the user device 1 which records this time.

For times T3-T9, the enforcement node 150 streams data to the user device 1 as the enforcement node 150 gets the payload from the destination server 602 and also populates the cache;

At time T10, the enforcement node 150 receives the full response, so TTLB is T10, now TTFB is T2 and TTLB is T10 in the cache. The enforcement node 150 sends the response to the user device 1 with TTLB:0 and TTFB:0. The values are zero because the user device 1 is already tracking the time and has the accurate TTFB and TTLB.

At time T12, the enforcement node 150 dequeues the request it queued from the user device 2; the total time this request spent in the Q is T12-T1, but this request's time is also being tracked on the user device 2 side. So to account for an accurate time, the TTFB is sent as T2−T11=−9 (assuming every T1 through T12 is 1 s) and TTLB T10−T11−1.

In this manner, the cached result can include negative values for TTFB and TTLB to account for the discrepancy. So, the user device 2 now computes the TTFB and TTLB as TTLB=11−9=2 and TTFB=11−1=10.

> TTFB=Client side TTFB+proxy side TTFB returned in header−proxy delay

TTLB:
If (client side TTLB>proxy side TTLB) {
 TTLB=client side TTLB−proxy delay+TTFB/2
} else {
 TTLB=proxy side TTLB−proxy delay+TTFB/2
}

Figure 16:
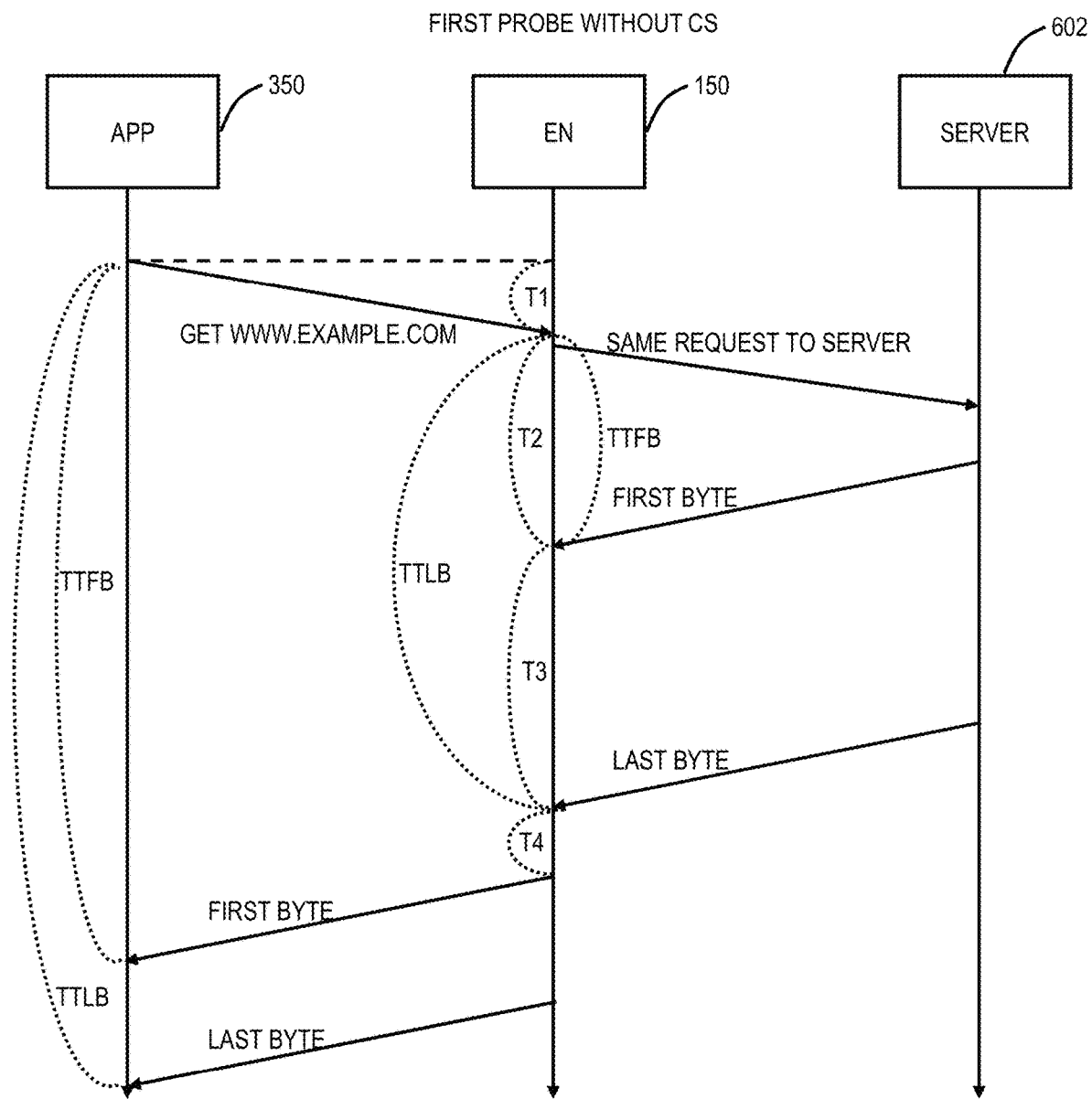
FIG. 16 is a flowchart of a first web probe without client streaming.

FIG. 16 is a flowchart of a first web probe without client streaming. T1 is the time taken from when the application 350 sends the request to when the enforcement node 150 receives it.

T2 is the time taken from when the enforcement node 150 receives request to when the enforcement node 150 receives a first byte of response. It may include time for DNS lookup, time to create TCP and SSL connection to the server 602 and Round-Trip Time (RTT) between the enforcement node 150 and the server 602.

13 is from when first byte is received to last byte is received by the enforcement node 150.

For the probes which are served from cache, the time T2+T3 is saved. T4 is not saved because data should be held and the scan job should be submitted in proxy to simulate the real handling as close as possible.

Figure 17:
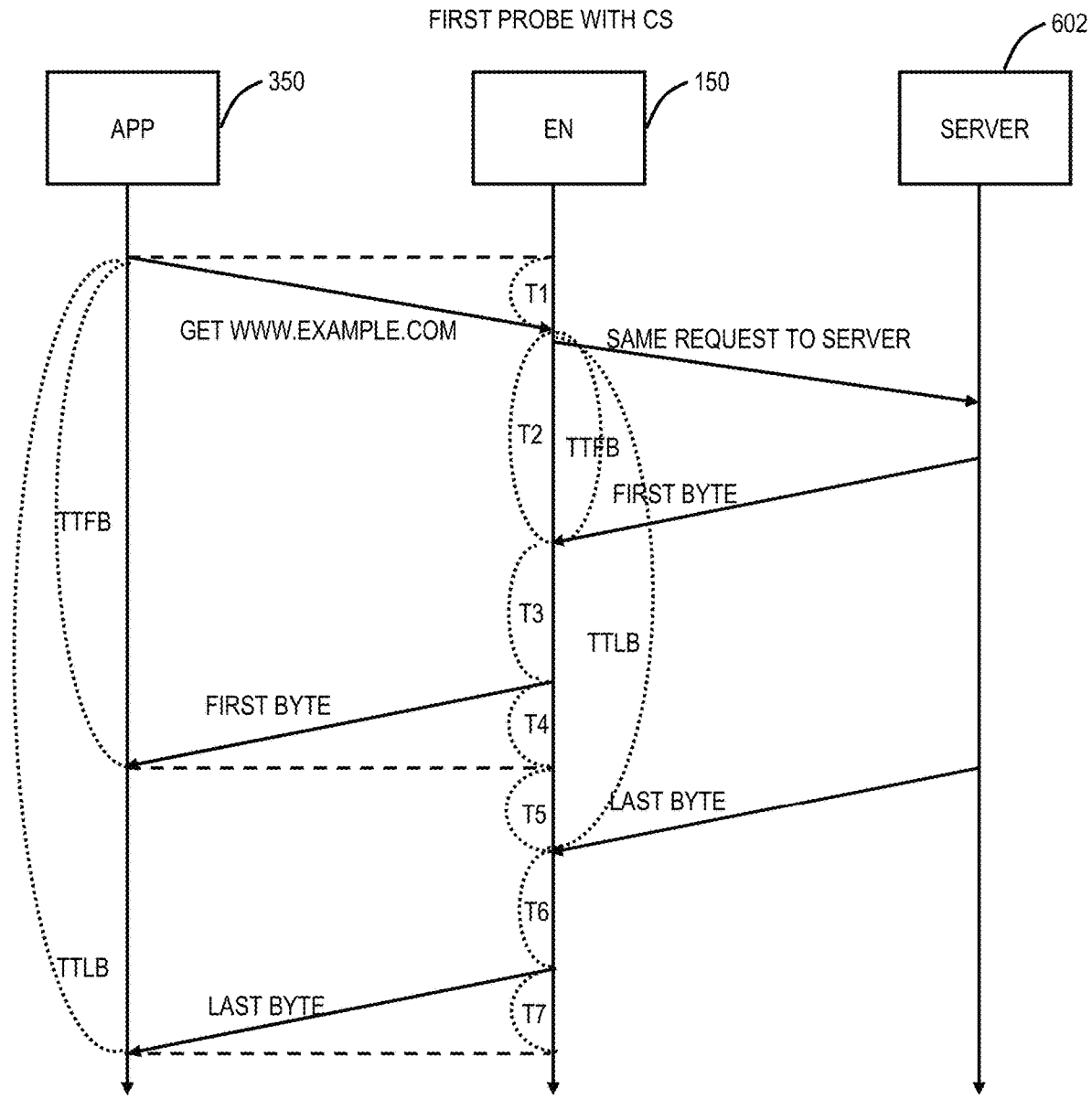
FIG. 17 is a flowchart of a first web probe with client streaming.

FIG. 17 is a flowchart of a first web probe with client streaming. T1 is the time taken from when the application 350 sends the request to when the enforcement node 150 receives it.

T2 is the time taken from when the enforcement node 150 receives request to when the enforcement node 150 receives first byte of response. It may include time for DNS lookup, time to create TCP and SSL connection to server and RTT between the enforcement node 150 and the server 602.

T3 is the time taken from when the enforcement node 150 receives first byte of response to when the enforcement node 150 sends the first byte to application 350. Client streaming is enabled in this case so first byte is sent before the whole response is received.

T4 is the take taken from when the enforcement node 150 sends the first byte to the application 350 to when the application 350 receives it. T6 includes complete/part of security scan (AV, file type, DLP . . . ) time.

In a first case, the probe can be to port 80 with the enforcement node 150 in the path. The application 350 sends the HTTP request (probe) to the actual destination (e.g., salesforce.com) with the X-UPM-INFO header. Note there is no "Connect" here. The enforcement node 150 intercepts the request even in the transparent mode and processes it as a web probe. Caching logic will kick in.

In another case, the probe can be to port 443. The application 350 sends the HTTPS request (probe) to the actual destination with the X-UPM-INFO header. Note there is no "Connect" here. If SSL inspection is turned on, the enforcement node 150 will intercept the traffic and processes it as a web probe. Caching logic will kick in. If SSL inspection is not turned on, then the probe is always sent to the destination. No Caching logic is exercised, and the destination will see all the probes as though coming from the enforcement node 150 IP.

Page Fetch Time

The enforcement node 150 is responsible for setting TTLB of every probe, and the application 350 uses the TTLB of last request in case of redirect (or multiple requests for different resources in the same web page) to calculate page fetch time.

Web Probe Cache Process

Figure 18:
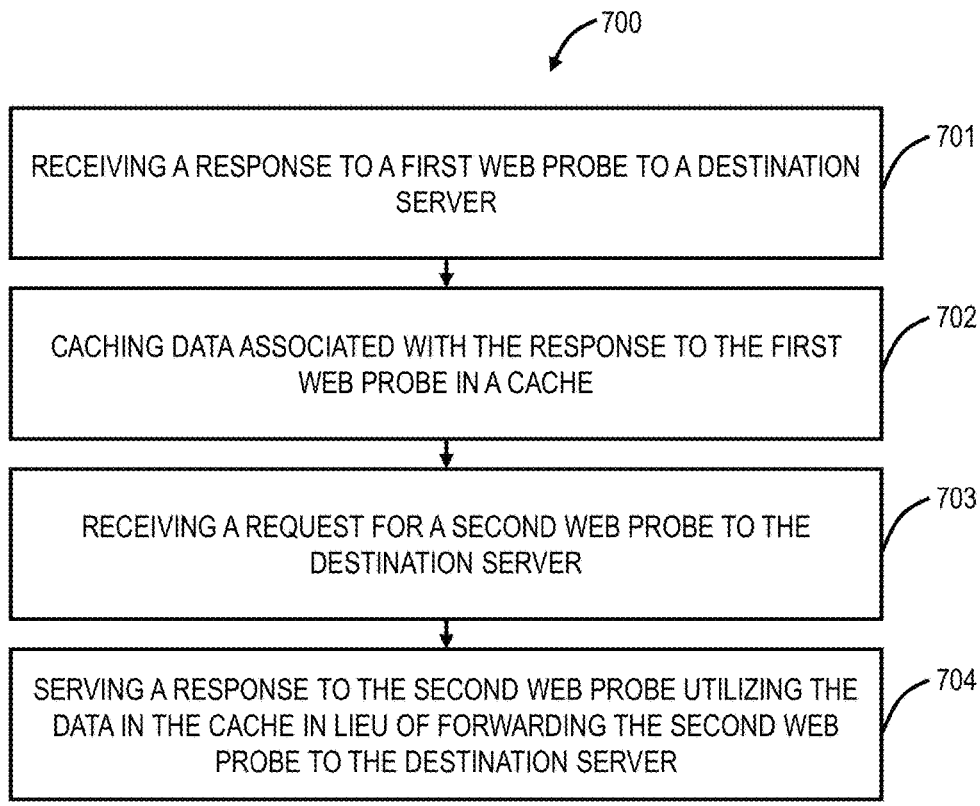
FIG. 18 is a flowchart of a process implemented by a proxy such as the enforcement node for caching web probes.

FIG. 18 is a flowchart of a process 700 implemented by a proxy such as the enforcement node 150 for caching web probes. The process 700 can be implemented as a method that includes steps, via a processing device configured to execute the steps, and via a non-transitory computer-readable medium that includes instructions that cause one or more processors to implement the steps.

The process 700 includes receiving a response to a first web probe to a destination server (step 701); caching data associated with the response to the first web probe in a cache (step 702); receiving a request for a second web probe to the destination server (step 703); and serving a response to the second web probe utilizing the data in the cache in lieu of forwarding the second web probe to the destination server (step 704).

The process 700 can include removing the data in the cache after a configurable time period. The process 700 can include receiving a request for the first web probe prior to the response; and sending the first web probe to the destination server prior to the response. The process 700 can include receiving a third web probe while a response to a fourth web probe is outstanding; and queuing the third web probe until the response to the fourth web probe is cached.

The data in the cache can include how the first web probe is forwarded to the destination server. The response to the second web probe can include truncated data. The web probe is one of a Hypertext Transfer Protocol (HTTP) and HTTP-Secure (HTTPS) request to a Uniform Resource Locator (URL) of the destination server. The data in the cache can be stored as a hash table with a key being an identifier for a tenant plus a hash of the first web probe and a value in the results.

Detecting Web Probe in an Encrypted Tunnel

Figure 19:
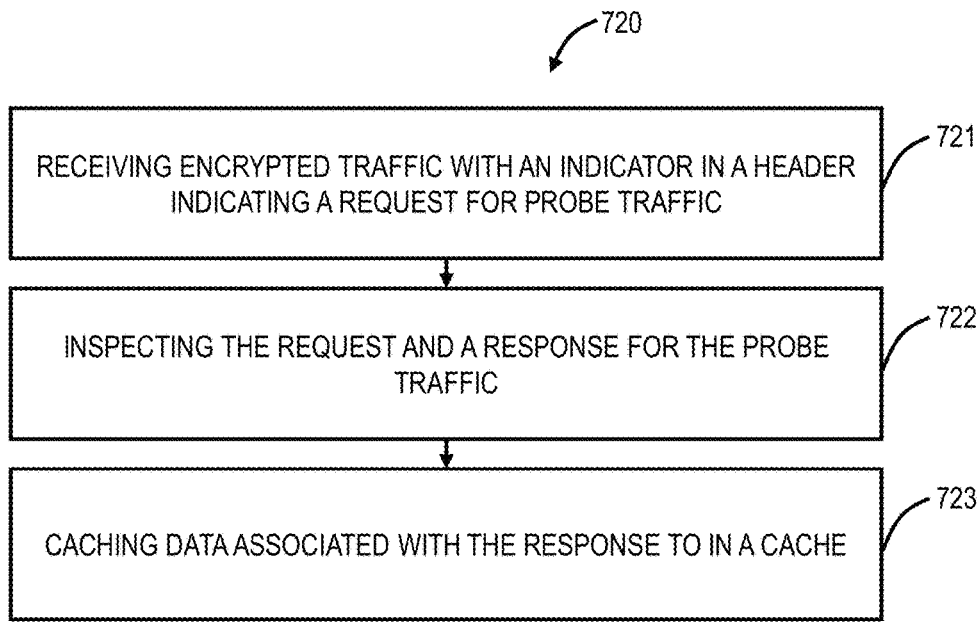
FIG. 19 is a flowchart of a process for detecting web probes in an encrypted tunnel.

FIG. 19 is a flowchart of a process 720 for detecting web probes in an encrypted tunnel. The process 720 can be implemented as a method that includes steps, via a processing device configured to execute the steps, and via a non-transitory computer-readable medium that includes instructions that cause one or more processors to implement the steps.

The process 720 includes receiving encrypted traffic with an indicator in a header indicating a request for probe traffic (step 721); inspecting the request and a response for the probe traffic (step 722); and caching data associated with the response to in a cache (step 723).

The process 720 can include serving a response to additional web probes utilizing the data in the cache in lieu of forwarding the additional web probes to the destination server. The process 720 can include checking the cache for the response; and serving the response out of the cache in lieu of forwarding the request to a destination. The process 720 can include removing the data in the cache after a configurable time period.

The indicator can be in a first HTTP CONNECT request or a proprietary HTTP header. The web probe can be one of a Hypertext Transfer Protocol (HTTP) and HTTP-Secure (HTTPS) request to a Uniform Resource Locator (URL) of the destination server. The proxy can be configured to not inspect the encrypted traffic.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements described herein can be used in any and all combinations with each other.

What is claimed is:

1. A method implemented by a proxy comprising:
   receiving a response to a first web probe to a destination server;
   recording times associated with receiving the response to the first web probe;
   caching data associated with the response to the first web probe in a cache,
   wherein the data includes unique entries created based on request properties, and policies that govern how further requests would be forwarded to the destination server;
   receiving a request for a second web probe to the destination server;
   serving a response to the second web probe utilizing the data in the cache in lieu of forwarding the second web probe to the destination server, wherein the serving the response utilizes the recorded times and policies to simulate a real response, thereby matching metrics of served responses to that of real responses; and
   applying all policies to the response served utilizing the data in the cache that are applied to regular traffic.

2. The method of claim 1, further comprising
   removing the data in the cache after a configurable time period.

3. The method of claim 1, further comprising
   receiving a request for the first web probe prior to the response; and
   sending the first web probe to the destination server prior to the response.

4. The method of claim 1, further comprising
   receiving a third web probe while a response to a fourth web probe is outstanding;
   queuing the third web probe until the response to the fourth web probe is cached;
   recording the wait time in the queue; and
   deducting the wait time from Time To First Byte (TTFB) and Time To Last Byte (TTLB) calculations.

5. The method of claim 1, wherein the response to the second web probe includes truncated data padded with zeros to make sure that the time to transfer the response is factored.

6. The method of claim 1, wherein the web probe is one of a Hypertext Transfer Protocol (HTTP) and HTTP-Secure (HTTPS) request to a Uniform Resource Locator (URL) of the destination server.

7. The method of claim 1, wherein the data in the cache is stored as a hash table with a key being an identifier for a tenant plus a hash of the first web probe and a value is results.

8. A non-transitory computer-readable storage medium having computer-readable code stored thereon for programming a proxy to perform steps of:
   receiving a response to a first web probe to a destination server;
   recording times associated with receiving the response to the first web probe;
   caching data associated with the response to the first web probe in a cache,
   wherein the data includes unique entries created based on request properties, and policies that govern how further requests would be forwarded to the destination server;
   receiving a request for a second web probe to the destination server;
   serving a response to the second web probe utilizing the data in the cache in lieu of forwarding the second web probe to the destination server, wherein the serving the response utilizes the recorded times and policies to simulate a real response, thereby matching metrics of served responses to that of real responses; and
   applying all policies to the response served utilizing the data in the cache that are applied to regular traffic.

9. The non-transitory computer-readable storage medium of claim 8, wherein the steps include
   removing the data in the cache after a configurable time period.

10. The non-transitory computer-readable storage medium of claim 8, wherein the steps include
    receiving a request for the first web probe prior to the response; and
    sending the first web probe to the destination server prior to the response.

11. The non-transitory computer-readable storage medium of claim 8, wherein the steps include
    receiving a third web probe while a response to a fourth web probe is outstanding;
    queuing the third web probe until the response to the fourth web probe is cached;
    recording the wait time in the queue; and
    deducting the wait time from Time To First Byte (TTFB) and Time To Last Byte (TTLB) calculations.

12. The non-transitory computer-readable storage medium of claim 8, wherein the response to the second web probe includes truncated data padded with zeros to make sure that the time to transfer the response is factored.

13. The non-transitory computer-readable storage medium of claim 8, wherein the web probe is one of a Hypertext Transfer Protocol (HTTP) and HTTP-Secure (HTTPS) request to a Uniform Resource Locator (URL) of the destination server.

14. The non-transitory computer-readable storage medium of claim 8, wherein the data in the cache is stored as a hash table with a key being an identifier for a tenant plus a hash of the first web probe and a value is results.

15. A proxy comprising:
one or more processors and memory comprising instructions that, when executed, cause the one or more processors to
receive a response to a first web probe to a destination server;
record times associated with receiving the response to the first web probe;
cache data associated with the response to the first web probe in a cache,
wherein the data includes unique entries created based on request properties, and policies that govern how further requests would be forwarded to the destination server;
receive a request for a second web probe to the destination server;
serve a response to the second web probe utilizing the data in the cache in lieu of forwarding the second web probe to the destination server, wherein the serving the response utilizes the recorded times and policies to simulate a real response, thereby matching metrics of served responses to that of real responses; and
apply all policies to the response served utilizing the data in the cache that are applied to regular traffic.

16. The proxy of claim 15, wherein the instructions that, when executed, cause the one or more processors to
remove the data in the cache after a configurable time period.

17. The proxy of claim 15, wherein the instructions that, when executed, cause the one or more processors to
receive a request for the first web probe prior to the response; and
send the first web probe to the destination server prior to the response.

18. The proxy of claim 15, wherein the instructions that, when executed, cause the one or more processors to
receive a third web probe while a response to a fourth web probe is outstanding;
queue the third web probe until the response to the fourth web probe is cached;
record the wait time in the queue; and
deduct the wait time from Time To First Byte (TTFB) and Time To Last Byte (TTLB) calculations.

* * * * *